US009534653B2

(12) United States Patent
Kim

(10) Patent No.: US 9,534,653 B2
(45) Date of Patent: Jan. 3, 2017

(54) PISTON ASSEMBLY FOR SHOCK ABSORBER

(71) Applicant: MANDO CORPORATION, Pyeongtaek-si (KR)

(72) Inventor: Hong Sig Kim, Jeollabuk-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/670,407

(22) Filed: Mar. 27, 2015

(65) Prior Publication Data
US 2015/0276005 A1    Oct. 1, 2015

(30) Foreign Application Priority Data

Mar. 28, 2014 (KR) ........................ 10-2014-0036719

(51) Int. Cl.
*F16F 9/00* (2006.01)
*F16F 9/512* (2006.01)
*F16F 9/34* (2006.01)

(52) U.S. Cl.
CPC ........... *F16F 9/5126* (2013.01); *F16F 9/3405* (2013.01)

(58) Field of Classification Search
CPC ............ F16F 9/5126; F16F 9/34; F16F 9/348; F16F 2228/04; F16F 9/067; F16F 2228/00
(Continued)

(56) References Cited

U.S. PATENT DOCUMENTS 4,503,951 A *   3/1985   Imaizumi ................ F16F 9/516
                                                                  188/280
5,129,488 A *   7/1992   Furuya ..................... B60G 17/08
                                                                  188/282.6
(Continued)

FOREIGN PATENT DOCUMENTS

JP            5078574         11/2012
KR       10-2011-0000769        1/2011
(Continued)

OTHER PUBLICATIONS

Office Action dated Jul. 4, 2016 for Korean Patent Application No. 10-2015-0034817 and its English summary provided by Applicant's foreign counsel.

*Primary Examiner* — Thomas J Williams
*Assistant Examiner* — Mahbubur Rashid
(74) *Attorney, Agent, or Firm* — Ladas & Parry, LLP

(57) ABSTRACT

A piston assembly for a shock absorber includes: a bypass passage formed along a vertical length direction of a piston rod in a small-diameter portion that is stepped in a lower portion of the piston rod reciprocating within a cylinder; a main piston connected to the small-diameter portion; an orifice assembly coupled to the small-diameter portion and disposed under the main piston to form an orifice passage, which communicates with the bypass passage; a housing coupled to the small-diameter portion and disposed under the orifice assembly, the housing having an opened upper side and forming a pressure chamber; and a sliding valve coupled to the orifice assembly and accommodated in the pressure chamber to generate a damping force by selectively opening and closing the orifice passage while reciprocating through a high-frequency section and a low-frequency section. Accordingly, the piston assembly is capable of improv- (Continued)

ing a ride comfort by exhibiting a damping performance over a low-frequency section and a high-frequency section.

16 Claims, 2 Drawing Sheets

(58) Field of Classification Search
USPC .......................................................... 188/317
See application file for complete search history.

(56) References Cited

U.S. PATENT DOCUMENTS

| | | | |
|---|---|---|---|
| 5,779,009 A * | 7/1998 | Iwasaki | B62D 33/0608 701/37 |
| 8,794,405 B2 * | 8/2014 | Yamashita | B60G 13/08 188/317 |
| 2005/0045440 A1 * | 3/2005 | Kock | F16F 9/512 188/322.15 |
| 2005/0056501 A1 * | 3/2005 | de Molina | F16F 9/34 188/284 |
| 2009/0078517 A1 * | 3/2009 | Maneyama | F16F 9/512 188/314 |
| 2009/0084647 A1 * | 4/2009 | Maneyama | F16F 9/465 188/314 |
| 2012/0160624 A1 * | 6/2012 | Katayama | F16F 9/3484 188/314 |
| 2012/0181126 A1 * | 7/2012 | de Kock | F16F 9/3488 188/282.8 |

FOREIGN PATENT DOCUMENTS

| | | |
|---|---|---|
| KR | 10-2012-0021258 | 3/2012 |
| KR | 10-2012-0075389 | 7/2012 |

* cited by examiner

PISTON ASSEMBLY FOR SHOCK ABSORBER

CROSS-REFERENCE(S) TO RELATED APPLICATION

This application claims the benefit of Korean Patent Application No. 10-2014-0036719, filed on Mar. 28, 2014, in the Korean Intellectual Property Office, the contents of which are incorporated herein by reference in its entirety.

BACKGROUND OF THE INVENTION

Field of the Invention

The present invention relates to a piston assembly for a shock absorber, and more particularly, to a piston assembly for a shock absorber, which is capable of improving a ride comfort by exhibiting a damping performance over a low-frequency section and a high-frequency section.

Description of the Related Art

Generally, a shock absorber is designed to support a weight of a vehicle body and suppress and dampen a vibration transferred from a road surface to the vehicle body, contributing to improving a ride comfort and protecting loaded goods and various parts of a vehicle.

Such a shock absorber includes a cylinder filled with a working fluid (oil), a reciprocating piston rod connected to a vehicle body, and a piston valve connected to a lower end of the piston rod to slide within the cylinder and control a flow of the working fluid.

However, in such a shock absorber, members corresponding to a low-frequency section and a high-frequency section need to be separately installed.

CITATION LIST

Patent Literature

Korean Patent Application No. 10-2011-0087171
Korean Patent Application No. 10-2011-0142135

SUMMARY OF THE INVENTION

The present invention has been made in an effort to solve the above problems and is directed to provide a piston assembly for a shock absorber, which is capable of improving a ride comfort by exhibiting a damping performance over a low-frequency section and a high-frequency section.

According to an embodiment of the present invention, a piston assembly for a shock absorber includes: a bypass passage formed along a vertical length direction of a piston rod in a small-diameter portion that is stepped in a lower portion of the piston rod reciprocating within a cylinder; a main piston connected to the small-diameter portion; an orifice assembly coupled to the small-diameter portion and disposed under the main piston to form an orifice passage, which communicates with the bypass passage; a housing coupled to the small-diameter portion and disposed under the orifice assembly, the housing having an opened upper side and forming a pressure chamber; and a sliding valve coupled to the orifice assembly and accommodated in the pressure chamber to generate a damping force by selectively opening and closing the orifice passage while reciprocating through a high-frequency section and a low-frequency section.

The orifice assembly may be integrally formed with the housing or may be detachably connected to the housing.

The orifice assembly may include: a cylindrical body which is coupled to the small-diameter portion and through which the sliding valve slidingly reciprocates over the low-frequency section and the high-frequency section; a plurality of first orifices penetrating through an upper portion of the body such that the bypass passage is coupled to an upper space of the pressure chamber, the pressure chamber being partitioned into the upper space and a lower space by the sliding valve; and a plurality of second orifices passing through a lower portion of the body such that the bypass passage is coupled to the lower space of the housing.

Virtual lines passing through centers of the plurality of first orifices may be disposed on a first plane, and virtual lines passing through centers of the plurality of second orifices may be disposed on a second plane separately from the first plane.

A volume of the lower space may be larger than a volume of the upper space.

A diameter of the second orifice may be larger than a diameter of the first orifice.

In the high-frequency section, the sliding valve may maintain the first orifices and the second orifices in an opened state.

In the low-frequency section, the sliding valve may move upward to close the first orifices.

An amount of a working fluid introduced from the bypass passage through the second orifices in the low-frequency section may be larger than an amount of a working fluid introduced from the bypass passage through the second orifices in the high-frequency section.

The sliding valve may include: an elevating piece reciprocating along an outer periphery of the orifice assembly; a valve sheet protruding from a top surface of the elevating piece in a ring shape, a valve disk being mounted on the valve sheet; and a guide piece extending along an edge of the elevating piece and facing an inner side of the housing.

The sliding valve may further include a plurality of sheet slits cut along a forming direction of the valve sheet and allowing the flow of the working fluid that is introduced from the bypass passage through the first orifices passing through the upper portion of the orifice assembly, wherein in the high-frequency section, the sliding valve maintains the first orifices in an opened state such that the working fluid is discharged through the sheet slit, and in the low-frequency section, the sliding valve maintains the first orifices in a closed state such that the working fluid is not discharged through the sheet slit.

The piston assembly may further include an O-ring disposed between the guide piece and the inner side of the housing and preventing leakage of the working fluid.

The piston assembly may further include a stopper formed at an upper edge of the second orifices passing through the lower portion of the orifice assembly and preventing the elevating piece from moving downward.

The housing may include: a bottom plate coupled to the small-diameter portion to form a bottom surface; a partition wall extending upward from an edge of the bottom plate to form the pressure chamber; and a plurality of second communication holes passing through the bottom plate and allowing the flow of the working fluid to the outside of the bottom plate in the low-frequency section.

DETAILED DESCRIPTION OF EXEMPLARY EMBODIMENTS

Figure 1:
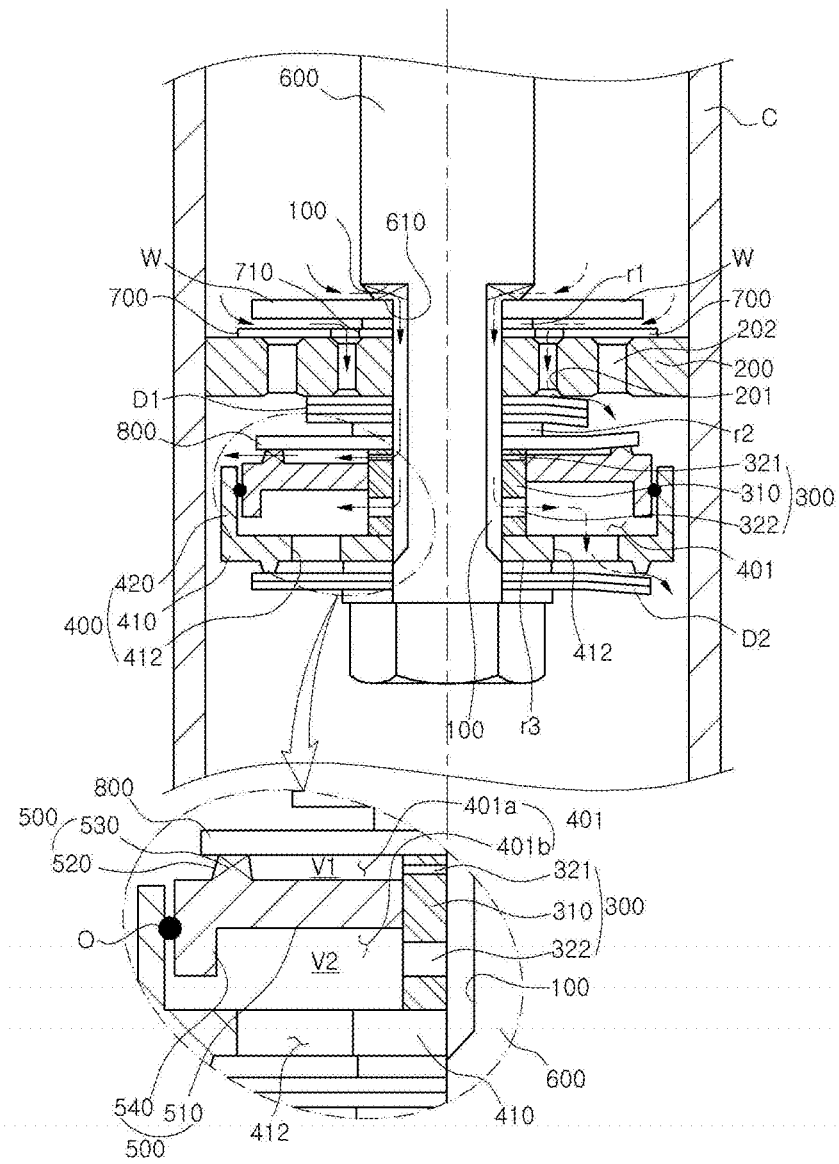
FIG. 1 is a cross-sectional conceptual diagram illustrating an overall configuration of a piston assembly for a shock absorber according to an embodiment of the present invention.

The advantages and features of the present invention and methods for achieving them will become more apparent from the following embodiments that are described in detail in conjunction with the accompanying drawings.

However, the present invention is not limited to the following embodiments and may be embodied in various forms.

These embodiments are provided so that this disclosure will be thorough and complete, and will fully convey the scope of the invention to those skilled in the art.

The scope of the present invention is defined by the appended claims.

Therefore, in some embodiments, detailed descriptions of well-known elements, operations, and technologies will be omitted since they would unnecessarily obscure the subject matters of the present invention.

Throughout the disclosure, like reference numerals refer to like elements. The terminology used herein is for the purpose of describing particular embodiments only and is not intended to be limiting of the present invention.

In this specification, the singular forms "a", "an", and "the" are intended to include the plural forms as well, unless the context clearly indicates otherwise. It will be understood that terms such as "comprise", "include", and "have", when used herein, specify the presence of stated elements and operations, but do not preclude the presence or addition of one or more other elements and operations.

Unless otherwise defined, all terms used herein, including technical and scientific terms, have the same meaning as commonly understood by one of ordinary skill in the art to which the inventive concept belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described with reference to the accompanying drawings.

FIG. 1 is a cross-sectional conceptual diagram illustrating an overall configuration of a piston assembly for a shock absorber according to an embodiment of the present invention.

For reference, with reference to the center line indicated by a dashed-dotted line along the center of FIG. 1, the left side of FIG. 1 illustrates the behaviors of elements in a high-frequency section where a pressure applied by a working fluid is low, and the right side of FIG. 1 illustrates the behaviors of elements in a low-frequency section where a pressure applied by a working fluid is high.

At this time, a solid arrow indicated on the left side of FIG. 1 along each passage including a bypass passage 100 represents a flow state of a working fluid in the high-frequency section, and a dashed arrow indicated on the right side of FIG. 1 represents a flow state of a working fluid in the low-frequency section.

As illustrated, the piston assembly for the shock absorber according to the present invention has a structure in which a piston rod 600 in which the bypass passage 100 is formed, a main piston 200, an orifice assembly 300, a sliding valve 500, and a housing 400 are sequentially coupled and fixed.

First, the bypass passage 100 is formed along a vertical length direction of the piston rod 600 in a small-diameter portion 610 that is stepped in a lower portion of the piston rod 600 reciprocating within a cylinder C.

The main piston 200 is coupled to the small-diameter portion 610 and exhibits a main damping performance while allowing the working fluid to flow in a compression stroke and a rebound stroke.

The orifice assembly 300 is coupled to the small-diameter portion 610 and is disposed under the main piston 200. The orifice assembly 300 forms an orifice passage, which communicates with the bypass passage 100, perpendicularly to a reciprocating direction of the piston rod 600.

A portion of the orifice assembly 300 blocks or releases the introduction of the working fluid from the bypass passage 100 in the high-frequency section and the low-frequency section in conjunction with the sliding valve 500 to be described below.

The housing 400 is coupled to the small-diameter portion 610 and is disposed under the orifice assembly 300. The housing 400 has an opened upper side and forms a pressure chamber 401. The housing 400 provides a space for the operation of the sliding valve 500 to be described above.

The sliding valve 500 is coupled to the orifice assembly 300 and is accommodated in the pressure chamber 401. The sliding valve 500 generates a damping force by selectively opening and closing the orifice passage while reciprocating through the high-frequency section and the low-frequency section.

For reference, the pressure chamber 401 is a space formed by the housing 400 having the opened upper side, but it should be understood that a space between the sliding valve 500 involving the opening and closing of the orifice assembly 300 to be described below and a valve disk 800 to be described is also the pressure chamber 401.

In addition, the sliding valve 500 is not almost involved in the flow of the working fluid, and is involved in the flow of the working fluid only in the rebound stroke in the compression stroke in conjunction with the orifice assembly 300 and the housing 400.

In addition to the above-described embodiment, the following various embodiments can also be applied to the present invention.

The piston assembly according to the present invention includes a washer W coupled to the small-diameter portion 610 and disposed above the main piston 200, and a first communication hole 710 coupled to the small-diameter portion 610 and disposed under the washer W to allow the flow of the working fluid through a rebound passage 201, and further includes an intake valve 700 that closes the compression passage 202 penetrating along a vertical direction of the main piston 200 in the rebound stroke and opens the compression passage 202 in the compression stroke.

A first retainer r1 is coupled to the small-diameter portion 610 and is disposed between the washer W and the intake valve 700. Thus, when the working fluid is introduced or discharged through the main piston 200 that performs the compression stroke and the rebound stroke, the first retainer r1 can provide a smooth working area without disrupting the deformation of the intake valve 700.

A first disk assembly D1 is coupled to the small-diameter portion 610 and is disposed under the main piston 200.

The first disk assembly D1 always communicates with the rebound passage 201 of the main piston 200 in the rebound stroke, but the opening degree of the first disk assembly D1 depends on a flow velocity (flow rate) of the working fluid.

That is, in the high-frequency section, the flow rate of the working fluid is small and the flow velocity of the working fluid is fast. Thus, the first disk assembly D1 communicates with the rebound passage 201 but the opening degree of the first disk assembly D1 is small. However, in the low-frequency section, the flow rate of the working fluid is large and the flow velocity of the working fluid is slow. Thus, the first disk assembly D1 communicates with the rebound passage 201 but the opening degree of the first disk assembly D1 is large as compared with the high-frequency section.

The valve disk 800, which is coupled through the small-diameter portion 610, is disposed under the first disk assembly D1. The sliding valve 500 moves upward in the low-frequency section and pushes up the valve disk 800.

At this time, a second retainer r2 is coupled to the small-diameter portion 610 and is disposed between the first disk assembly D1 and the valve disk 800. The second retainer r2 maintains a gap that provides a smooth working area of the first disk assembly D1.

In addition, a second disk assembly D2 is coupled to the small-diameter portion 610 and is disposed under the housing 400.

The second disk assembly D2 communicates with the pressure chamber 401 of the housing in the rebound stroke, but the opening degree of the second disk assembly D2 depends on a flow velocity (flow rate) of the working fluid.

That is, in the high-frequency section, the flow rate of the working fluid is small and the flow velocity of the working fluid is fast. Thus, the second disk assembly D2 communicates with the pressure chamber 401 but the opening degree of the second disk assembly D2 is small. However, in the low-frequency section, the flow rate of the working fluid is large and the flow velocity of the working fluid is slow. Thus, the second disk assembly D2 communicates with the pressure chamber 401 but the opening degree of the second disk assembly D2 is large as compared with the high-frequency section.

A third retainer r3 is coupled to the small-diameter portion 610 and is disposed between the housing 400 and the second disk assembly D2. The third retainer r3 maintains a gap that provides a smooth working area of the second disk assembly D2.

On the other hand, as described above, the orifice assembly 300 has the orifice passage that communicates with the bypass passage 100 and includes a body 310 and first and second orifices 321 and 322.

For reference, the pressure chamber 401 is partitioned into an upper space 401a and a lower space 401b by the sliding valve 500 to be described below.

First, the body 310 is coupled to the small-diameter portion 601. The body 310 is a cylindrical member through which the sliding valve 500 slidingly reciprocates over the low-frequency section and the high-frequency section.

The first orifice 321 is plurally formed to penetrate through the upper portion of the body 310 such that the lower space 401b and the bypass passage 100 are coupled to each other.

A volume V2 of the lower space 401b is larger than a volume V1 of the upper space 401a.

In addition, the second orifice 322 is plurally formed to penetrate through the lower portion of the body 310 such that the lower space 401b and the bypass passage 100 are coupled to each other.

When considering that the amount of the working fluid introduced through the pressure chamber 401 is relatively larger in the low-frequency section than in the high-frequency section, it is preferable that a diameter of the second orifice 322 is larger than a diameter of the first orifice 321.

In other words, that the diameter of the second orifice 322 is larger than the diameter of the first orifice 321 has relation to the fact that the volume V2 of the lower space of the pressure chamber 401 is larger than the volume V1 of the upper space of the pressure chamber 401.

Virtual lines passing through the centers of the plurality of first orifices 321 are disposed on a first plane (see P1 of FIG. 2), which is the same plane. Virtual lines passing through the centers of the plurality of second orifices 322 are disposed on a second plane (see P2 of FIG. 2) separate from the first plane P1. In this manner, the smooth damping performance can be exhibited in the high-frequency section and the low-frequency section.

In the high-frequency section, the sliding valve 500 causes the first orifice 321 and the second orifice 322 to maintain an opened state. In the low-frequency section, the sliding valve 500 moves upward to close the first orifice.

In addition, as described above, the amount of the working fluid introduced from the bypass passage 100 to the lower space 401b of the pressure chamber 401 through the second orifice 322 in the low-frequency section is larger than the amount of the working fluid introduced from the bypass passage 100 to the lower space 401b through the second orifice 322 in the high-frequency section.

On the other hand, as described above, the housing 400 forms the pressure chamber 401 to accommodate the sliding valve 500 to be described below, and includes a bottom plate 410, a partition wall 420, and a second communication hole 412.

That is, the bottom plate 410 is coupled to the small-diameter portion 610 to form a bottom surface. The partition wall 420 extends upward from the edge of the bottom plate 410 to form the pressure chamber 401.

The second communication hole 412 is plurally formed to pass through the bottom plate 410 and allows the flow of the working fluid to the outside of the bottom plate 410 in the low-frequency section.

Therefore, in the high-frequency section, the second communication hole 412 is in a closed state by the second disk assembly D2, and thus, the working fluid is not discharged to the lower side of the housing 400. However, in the low-frequency section in which the flow rate of the working fluid is high, the second disk assembly D2 allows elastic deformation and opens the second communication hole 412, and thus, the working fluid is discharged to the lower side of the housing 400.

In some cases, the housing 400 may be variously applied and modified. For example, the housing 400 may be integrally formed with the above-described orifice assembly 300, or may be detachably coupled to the above-described orifice assembly 300.

On the other hand, as described above, the sliding valve 500 is accommodated in the pressure chamber 401 and reciprocatingly moves upward and downward according to the amount of the working fluid introduced over the low-frequency section and the high-frequency section. The sliding valve 500 includes an elevating piece 510, a valve sheet 520, a sheet slit 530, and a guide piece 540.

The elevating piece 510 reciprocates along the outer periphery of the orifice assembly 300. A reciprocating driving source is the working fluid that is introduced into and discharged from the pressure chamber 401 through the second orifice 322.

The valve sheet 520 protrudes from the top surface of the elevating piece 510 in a ring shape. The valve disk 800 is mounted on the valve sheet 520.

The sheet slit 530 is a plurality of members that are cut along a forming direction of the valve sheet 520 and allow the flow of the working fluid that is introduced from the bypass passage 100 through the first orifice 321 passing through the upper portion of the orifice assembly 300.

The guide piece 540 extends along the edge of the elevating piece 510 and faces the inner side of the housing 400.

The sliding valve 500 maintains the first orifice 321 in an opened state such that the working fluid is discharged through the sheet slit 530 in the high-frequency section.

At this time, the sliding valve 500 maintains the first orifice 321 in a closed state such that the working fluid is not discharged through the sheet slit 530 in the low-frequency section.

In addition, an O-ring O is disposed between the guide piece 540 and the inner side of the housing 400 and prevents leakage of the working fluid.

Figure 2:
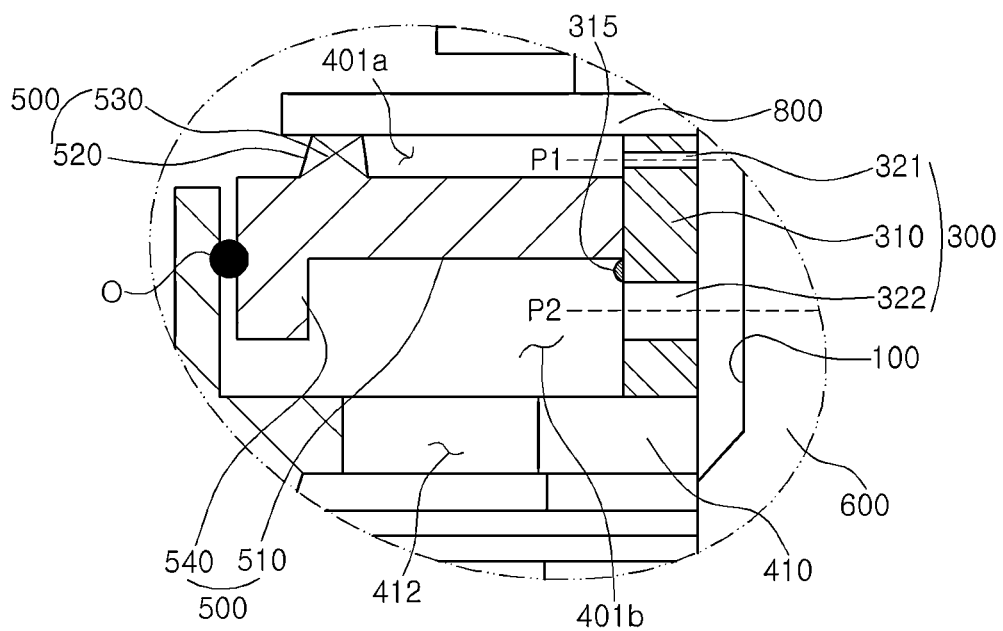
FIG. 2 is an expanded cross-sectional conceptual diagram illustrating main parts of a piston assembly for a shock absorber according to another embodiment of the present invention.

On the other hand, it is obvious that the present invention can also be applied to a structure in which a stopper 315 is formed at an upper edge of the second orifice 322 passing through the lower portion of the body 310 in the orifice assembly 300 of FIG. 2.

The stopper 315 is provided for preventing an occurrence of a problem that disrupts the exhibition of the damping performance because the elevating piece 510 excessively drops while closing the second orifice 322.

It is obvious that the stopper 315 can be manufactured through various applications and design modifications. For example, the stopper 315 may be detachably coupled to the outer periphery of the body 310 in a C-shape, or may be formed by a protrusion or ring having a specific shape, or may be integrally formed with the body 310 and protrude in a rib shape.

The basic technical idea of the present invention is to provide the piston assembly for the shock absorber, which is capable of improving the ride comfort by exhibiting the damping performance over the low-frequency section and the high-frequency section.

According to the present invention, the damping performance is appropriately implemented while the sliding valve accommodated in the pressure chamber of the housing and reciprocatingly mounted along the orifice assembly opens and closes the orifice passage over the low-frequency and high-frequency sections, thereby improving the ride comfort through the degressive damping behavior.

In particular, the ride comfort can be improved by effectively preventing a small frequent in the high-frequency section influencing the ride comfort due to a change in the damping force according to the frequency.

Since the sliding valve is accommodated in the housing and reciprocates in a sliding manner, the total height of the apparatus can be reduced to thereby make the apparatus compact.

In addition, the assembly is completed by sequentially inserting the elements into the small-diameter portion of the piston rod, the manufacturing process can be simplified to thereby reduce the production cost.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| | |
|---|---|
| 100: bypass passage | 200: main piston |
| 201: rebound passage | 202: compression passage |
| 300: orifice assembly | 310: body |
| 315: stopper | 321: first orifice |
| 322: second orifice | 400: housing |
| 401: pressure chamber | 401a: upper space |
| 401b: lower space | 410: bottom plate |
| 412: second communication hole | 420: partition wall |
| 500: sliding valve | 510: elevating piece |
| 520: valve sheet | 530: sheet slit |
| 540: guide piece | 600: piston rod |
| 610: small-diameter portion | 700: intake valve |
| 710: first communication hole | 800: valve disk |
| C: cylinder | D1: first disk assembly |
| D2: second disk assembly | O: O-ring |
| P1: first plane | P2: second plane |
| r1: first retainer | r2: second retainer |
| r3: third retainer | W: washer |

What is claimed is:

1. A piston assembly for a shock absorber, comprising:
a bypass passage formed along a vertical length direction of a piston rod in a small-diameter portion that is stepped in a lower portion of the piston rod reciprocating within a cylinder;
a main piston connected to the small-diameter portion;
an orifice assembly coupled to the small-diameter portion and disposed under the main piston to form an orifice passage, which communicates with the bypass passage;
a housing coupled to the small-diameter portion and disposed under the orifice assembly, a top of the housing having an opened portion and the housing forming a pressure chamber; and
a sliding valve coupled to the orifice assembly and accommodated in the pressure chamber to generate a damping force by selectively opening and closing the orifice passage while reciprocating through a high-frequency section and a low-frequency section,
wherein the orifice assembly includes:
 a cylindrical body which is coupled to the small-diameter portion and through which the sliding valve slidingly reciprocates over the low-frequency section and the high-frequency section;
 at least one first orifice penetrating through an upper portion of the body such that the bypass passage is coupled to an upper space of the pressure chamber, the pressure chamber being partitioned into the upper space and a lower space by the sliding valve; and
 at least one second orifice passing through a lower portion of the body and connecting the bypass passage to the lower space of the housing.

2. The piston assembly according to claim 1, wherein the orifice assembly is integrally formed with the housing.

3. The piston assembly according to claim 1, wherein a first plane passes through centers of the at least one first orifice, and
a second plane is formed separately from the first plane and passes through centers of the at least one second orifice.

4. The piston assembly according to claim 1, wherein a volume of the lower space is larger than a volume of the upper space.

5. The piston assembly according to claim 1, wherein a diameter of the second orifice is larger than a diameter of the first orifice.

6. The piston assembly according to claim 1, wherein the sliding valve is configured to maintain the first orifice and the second orifice in an opened state in the high-frequency section.

7. The piston assembly according to claim 1, wherein the sliding valve is configured to move upward to close the first orifice in the low-frequency section.

8. The piston assembly according to claim 1, wherein an amount of a working fluid introduced from the bypass passage through the second orifice in the low-frequency section is larger than an amount of a working fluid introduced from the bypass passage through the second orifice in the high-frequency section.

9. The piston assembly according to claim 1, wherein the sliding valve includes:
   an elevating piece reciprocating along an outer periphery of the orifice assembly;
   a valve sheet protruding from a top surface of the elevating piece in a ring shape, a valve disk being mounted on the valve sheet; and
   a guide piece extending along an edge of the elevating piece and facing an inner side of the housing.

10. The piston assembly according to claim 9, wherein the sliding valve further includes at least one sheet slit cut along a forming direction of the valve sheet and allowing the flow of the working fluid that is introduced from the bypass passage through at least one first orifice passing through the upper portion of the orifice assembly,
   wherein the sliding valve is configured to maintain the first orifice in an opened state in the high-frequency section such that the working fluid is discharged through the sheet slit, and
   the sliding valve is configured to maintain the first orifice in a closed state in the low-frequency section such that the working fluid is not discharged through the sheet slit.

11. The piston assembly according to claim 9, further comprising an O-ring disposed between the guide piece and the inner side of the housing and preventing leakage of the working fluid.

12. The piston assembly according to claim 1, wherein the housing includes:
   a bottom plate coupled to the small-diameter portion to form a bottom surface;
   a partition wall extending upward from an edge of the bottom plate to form the pressure chamber; and
   at least one second communication hole passing through the bottom plate and allowing the flow of the working fluid to the outside of the bottom plate in the low-frequency section.

13. The piston assembly of claim 1, further comprising:
   a elevating piece reciprocating along an outer periphery of the orifice assembly; and
   a stopper formed at an upper edge of the second orifice passing through a lower portion of the orifice assembly and preventing the elevating piece from moving downward.

14. The piston assembly of claim 1, further comprising a valve disk provided above the orifice assembly and the housing.

15. A piston assembly for a shock absorber, comprising:
   a bypass passage formed along a vertical length direction of a piston rod in a small-diameter portion that is stepped in a lower portion of the piston rod reciprocating within a cylinder;
   a main piston connected to the small-diameter portion;
   an orifice assembly coupled to the small-diameter portion and disposed under the main piston to form an orifice passage, which communicates with the bypass passage;
   a housing coupled to the small-diameter portion and disposed under the orifice assembly, the housing having an opened upper side and forming a pressure chamber; and
   a sliding valve coupled to the orifice assembly and accommodated in the pressure chamber to generate a damping force by selectively opening and closing the orifice passage while reciprocating through a high-frequency section and a low-frequency section,
   wherein the sliding valve includes:
      an elevating piece reciprocating along an outer periphery of the orifice assembly;
      a valve sheet protruding from a top surface of the elevating piece in a ring shape, a valve disk being mounted on the valve sheet; and
      a guide piece extending along an edge of the elevating piece and facing an inner side of the housing, and
   wherein the piston assembly further comprises a stopper formed at an upper edge of at least one second orifice passing through the lower portion of the orifice assembly and preventing the elevating piece from moving downward.

16. A piston assembly for a shock absorber, comprising:
   a bypass passage formed along a vertical length direction of a piston rod in a small-diameter portion that is stepped in a lower portion of the piston rod reciprocating within a cylinder;
   a main piston connected to the small-diameter portion;
   an orifice assembly coupled to the small-diameter portion and disposed under the main piston to form an orifice passage, which communicates with the bypass passage;
   a housing coupled to the small-diameter portion and disposed under the orifice assembly, a top of the housing having an opened portion and the housing forming a pressure chamber; and
   a sliding valve coupled to the orifice assembly and accommodated in the pressure chamber to generate a damping force by selectively opening and closing the orifice passage while reciprocating through a high-frequency section and a low-frequency section,
   wherein the orifice assembly is detachably connected to the housing.

* * * * *